Oct. 7, 1941.                    C. R. NEILON                    2,258,190
                    UNITARY PACKING AND GLAND STRUCTURE
                           Filed Sept. 4, 1940

INVENTOR
Claude R. Neilon
BY
D. Verne Martin
ATTORNEY

Patented Oct. 7, 1941

2,258,190

UNITED STATES PATENT OFFICE 2,258,190

UNITARY PACKING AND GLAND STRUCTURE

Claude R. Neilon, Houston, Tex., assignor to The National Supply Company, Pittsburgh, Pa., a corporation of Pennsylvania Application September 4, 1940, Serial No. 355,349

1 Claim. (Cl. 285—22)

My invention relates to a packing and gland structure particularly adapted for quick axial positioning as a unit in a stuffing box casing head to surround and pack-off an axially disposed element, such as a string of drill pipe or tubing, commonly used in controlling the flow of fluid under pressure from well holes.

The principal object of my invention is to provide a unitary packing assembly made in two symmetrical halves that may be quickly applied around a drill pipe or tubing or the like and lowered into position in a casing head in case of emergency. Another object is to provide a simple means for detachably holding the half sections of packing in a unitary assemblage with the gland and the follower ring sections.

Another object of my invention is to provide a packing and gland assembly adapted for quick axial positioning around a tubing in an oil well casing head, or the like, in which a single set of bolts and nuts serve to hold the component parts together as a unit and serve to provide a means for compressing the packing assembly into fluid tight sealing engagement with the well tubing.

While this invention was designed to be used in a well casing head for packing off and providing a seal between the casing head and the suspended string of drill pipe or tubing passing therethrough, it is capable of use in other devices.

Other objects and advantages will be apparent in the following specification of an embodiment of the invention illustrated in the accompanying drawing, wherein.

Figure 6:
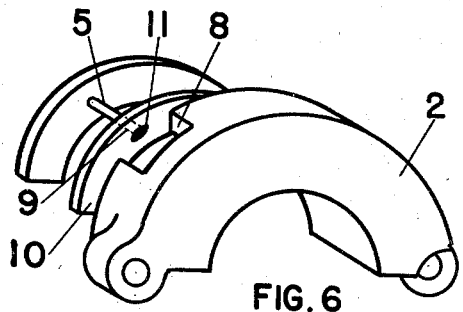
Figs. 5 and 6 are perspective views of the half sections of the gland and ring in assembled relation with the packing removed.
Figure 2:
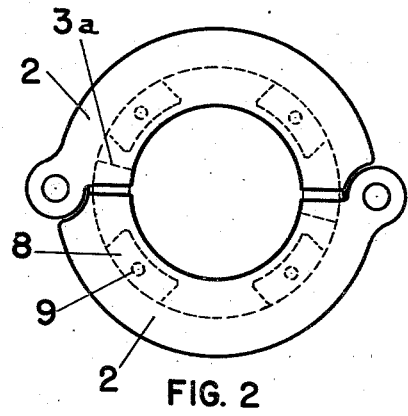
Fig. 2 is a top plan view of the unitary structure.
Figure 5:
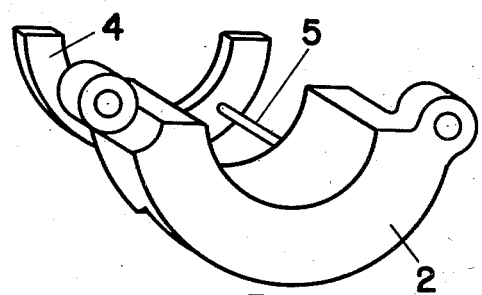
Figure 4:
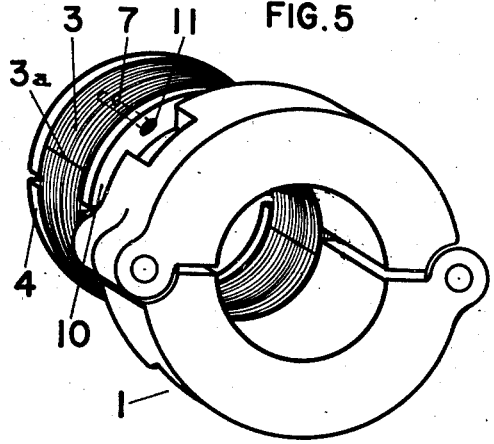
Fig. 4 is a perspective view showing the unitary structure in assembled relation with the packing in place.
Figure 3:
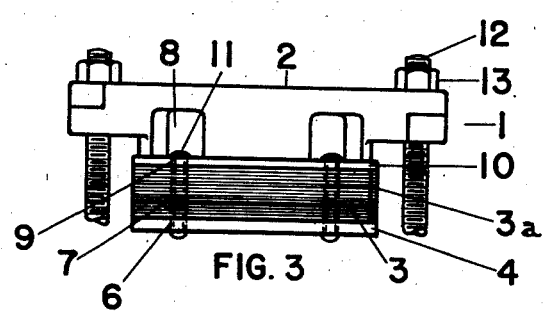
Fig. 3 is an external elevational view showing the assembled relation of the unitary structure.
Figure 1:
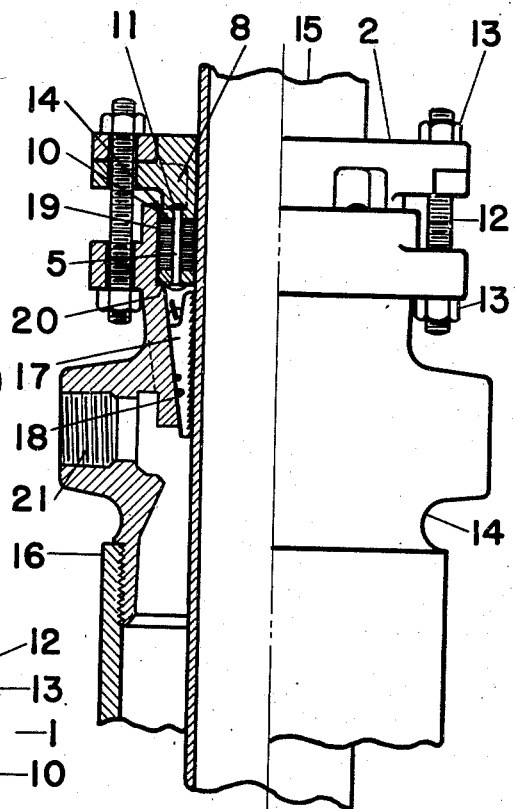
Fig. 1 is a view partly in elevation and partly in section through a suitable form of stuffing box casing head showing the unitary packing and gland structure assembled in the head and surrounding the tubing and providing a seal therefor.

In the drawing the numeral 1 designates generally a packing and gland assembly composed of a gland 2, a packing 3 and a follower ring 4. These three elements are each split on an axial plane to form duplicate halves which are secured together by rivets 5. The follower ring is provided with a series of holes 6, to receive the rivets 5. The packing is provided with holes 7 to receive said rivets. The gland is recessed, as at 8, and provided with holes 9 in the lower flanged portion 10. The rivets 5 extend vertically up from the lower surface of the follower ring, passing through the holes 6, 7 and 9 in the ring, packing and gland respectively. In assembling the half portions of the gland, packing and ring into unitary half sections, I stagger the split packing relative to the gland and ring as at 3a (Figs. 2, 3 and 4) in order to shift the joints in the packing away from the joints in the gland and ring. By this method the packing serves as a lug between the gland and ring to assist in aligning the two halves. The upper ends of the rivets 5, which protrude above the flanged portion 10, are welded, as at 11, to said flanged portions to secure the packing structures into unitary assemblages. The recesses 8 allow access to the free ends of the rivets to facilitate welding to the gland or for any other suitable means for securing said elements into unitary half structures. The packing is compressed by means of pressure on double end bolts 12 and the nuts 13 reacting against exterior bolt receiving extensions on the head 14, provided to draw the packing assembly into sealing engagement with the head 14 and the tubing or drill pipe 15. As the packing is compressed the rivets slide down through the holes in the follower ring into the space above the slips 17.

The invention is shown as applied to a well casing head 14 which is threadably attached at its lower end to an outer string of casing 16. The purpose of the casing head is to provide a means for suspending and sealing off the inner string of tubing or drill pipe 15 which extends up through the outer casing and the head and is suspended within the head by means of slips 17, positioned to seat on an inwardly and downwardly tapered bore 18 within the head and adapted to grip the tubing 15.

Fluid outlet tapped holes 21 to receive take-off pipes are provided in the body of the head below the slips.

In order to provide a seal between the outer casing 16 and the tubing 15 and to prevent the escape of fluid therebetween, the upper end of the casing head, above the tapered bore and slips, is provided with a cylindrical bore 19 to receive the above mentioned packing and gland assemblage 1. The follower ring 4 rests on a shoulder 20 formed in the cylindrical bore at its junction with the inwardly and downwardly tapered bore 18.

When an emergency arises or when it is desirable and necessary to shut off the fluid pressure hurriedly the unitary packing and gland assemblage is quickly slipped around the tubing or drill pipe 15 and is then pushed down the tubing or drill pipe so that it will enter the cylindrical bore within the upper end of the casing head 14. The assemblage is then speedily bolted to the extensions on the head 14 and pulled into a sealing engagement around the tubing or drill pipe by compressing the packing 3 by means of the bolts 12 and nuts 13.

It will be particularly noted that the same bolts 12, together with their nuts 13, which are provided to hold the two halves of the packing unit together to form a cylindrical assembly are also used to draw the assembled unit into sealing engagement around the well tubing. This provides a simple means for speedily effecting a fluid tight pressure seal between the tubing and casing head bore, thus preventing a costly blowout, both from the standpoint of financial damage and possible serious injury or a fatal accident to the operators.

While only one form of the invention has herein been disclosed it is understood that further embodiments, modifications and variations may be resorted to within the spirit of the invention as herein claimed.

What I claim is:

A packing and gland unit adapted for quick axial positioning around a tubing in an oil well casing head or the like having an internal shoulder and provided with bolt receiving exterior extensions, said unit including duplicate half-sections, each comprising half gland, packing, and follower ring elements, means to hold said elements together to form said sections, bolts to hold said half sections together to form a unitary cylindrical assembly, said bolts being elongated to pass through said casing head extensions, and nuts threaded on said bolts against said extensions, whereby the bolts serve to hold the half sections together and by reaction against said casing head extensions to compress the packing around the tubing in the casing head.

CLAUDE R. NEILON.